United States Patent [19]

Pikulski

[11] Patent Number: 5,106,289
[45] Date of Patent: Apr. 21, 1992

[54] ELASTOMERIC MOLD FOR OPTICAL FIBER BUFFER

[75] Inventor: Joseph L. Pikulski, Westlake Village, Calif.

[73] Assignee: Hughes Aircraft Company, Los Angeles, Calif.

[21] Appl. No.: 669,566

[22] Filed: Mar. 14, 1991

[51] Int. Cl.⁵ .................. B29C 39/02; B29C 39/10
[52] U.S. Cl. ..................... 425/436 R; 249/83; 249/85; 249/134; 425/DIG. 44
[58] Field of Search ............... 425/DIG. 44, 436 R, 425/117; 249/83, 85, 134

[56] References Cited

U.S. PATENT DOCUMENTS

| | | | |
|---|---|---|---|
| 2,716,623 | 8/1955 | Tator | 249/95 |
| 2,761,714 | 9/1956 | Cuskie | 403/225 |
| 3,084,390 | 4/1963 | Anderson | 425/DIG. 44 |
| 3,142,716 | 7/1964 | Gardener | 249/95 |
| 3,480,251 | 11/1969 | Pietrzak | 249/127 |
| 3,542,328 | 11/1970 | Deitrich | 249/95 |
| 3,937,438 | 2/1976 | Fox et al. | 249/127 |
| 4,044,984 | 8/1977 | Shimizu | 249/95 |

Primary Examiner—Willard Hoag
Attorney, Agent, or Firm—C. D. Brown; R. M. Heald; W. K. Denson-Low

[57] ABSTRACT

A transparent elastomeric mold 30 capable of precisely reconstituting the buffer coating surrounding an optical fiber 54. The inventive elastomeric mold 30 is disposed to shape a buffer coating applied to an optical fiber in accordance with the dimensions of a master fiber 32. The mold 30 includes an elastomeric slab 38 for substantially confining the buffer coating within a channel 48 having a cross-sectional dimension substantially identical to that of the master fiber 32. The slab 38 includes an inner surface 50 which defines the channel 48 along a longitudinal axis L. The inventive mold 30 may also include an arrangement of arm members 34, 36 for flexing the elastomeric slab 38 in order to open the channel along the longitudinal axis L.

7 Claims, 3 Drawing Sheets

ELASTOMERIC MOLD FOR OPTICAL FIBER BUFFER

BACKGROUND OF THE INVENTION

1. Field of the Invention

This invention relates to methods and apparatus for applying buffer coatings to optical fibers. More specifically, this invention relates to mold structures utilized in such coating applications.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

As is known in the art, optical fibers are generally coated with a buffer material to insulate the fiber from the external environment. As the buffer coatings may become damaged by exposure to environmental influences, it is occasionally necessary to reconstitute a portion of the fiber buffer. Reconstitution of the buffer is also required when optical fibers are spliced together— since the buffer in the general vicinity of the splice must be removed. After the fibers have been joined a new buffer coating is applied to the spliced fiber segment. When damage exists solely in the buffer coating and not in the underlying optical fiber, it may suffice to replace a mere portion of the coating.

When a portion of an optical fiber buffer is reconstituted, it is typically important that the original buffer diameter be preserved. For example, small irregularities in the diameter of the coating may preclude the coated fiber from being appropriately wound around a bobbin or other dispensing mechanism. Inappropriate winding of the coated fiber may cause deviation in the desired dimensions of the resultant "fiber pack", thus complicating system design.

The buffer coating surrounding an optical fiber is conventionally reconstituted with use of a "sandwich" type mold. Two rigid Plexiglas plates are inscribed with a semicircular trough. Both troughs are sprayed with teflon to prevent adhesion of the fiber to the Plexiglas. Next, epoxy which will be cured to form the reconstituted coating is placed into the trough and onto the surrounding planar surface of one of the plates. The fiber to be coated is then placed into the trough containing the epoxy and the plates are sandwiched together such that the troughs are in alignment. In this way the fiber and epoxy occupy a cylindrical volume defined by the aligned troughs. The plates are held in place by screws and indexing pins while the epoxy is cured by illumination with ultraviolet light.

Difficulties often arise in connection with the removal of the coated fiber from the Plexiglas mold. For example, despite the presence of the teflon spray the coating epoxy is prone to adhere to the Plexiglas plates. This type of sticking can cause defects in the coating surface. Moreover, the teflon spray may cloud the cured coating. In addition, a thin layer of cured epoxy originating from between the mold plates is typically attached to either side of the reconstituted buffer. This extraneous "mold flash" is partially eliminated by abrasive polishing, but some variation in the diameter of the new buffer coating typically remains.

More fundamentally, the degree to which the diameter of the reconstituted buffer coating agrees with that of the original coating is inherently limited by the accuracy with which the troughs may be inscribed. It is believed that present methods of mechanical inscription yield errors resulting in diameter variations of between 20 and 30 microns.

Accordingly, a need in the art exists for a mold structure capable of accurately reconstituting the buffer coating surrounding an optical fiber.

SUMMARY OF THE INVENTION

The need in the art for a mold structure able to precisely reconstitute the buffer coating surrounding an optical fiber is addressed by the elastomeric mold of the present invention. The inventive elastomeric mold is disposed to shape a buffer coating applied to an optical fiber in accordance with the dimensions of a master fiber. The mold includes an elastomeric slab for substantially confining the buffer coating within a channel having a cross-sectional dimension substantially identical to that of the master fiber. The mold includes an inner surface which defines the channel along a longitudinal axis. The inventive mold also includes an arrangement of arm members for flexing the elastomeric slab in order to open the channel along the longitudinal axis.

DETAILED DESCRIPTION OF THE INVENTION

Figure 1:
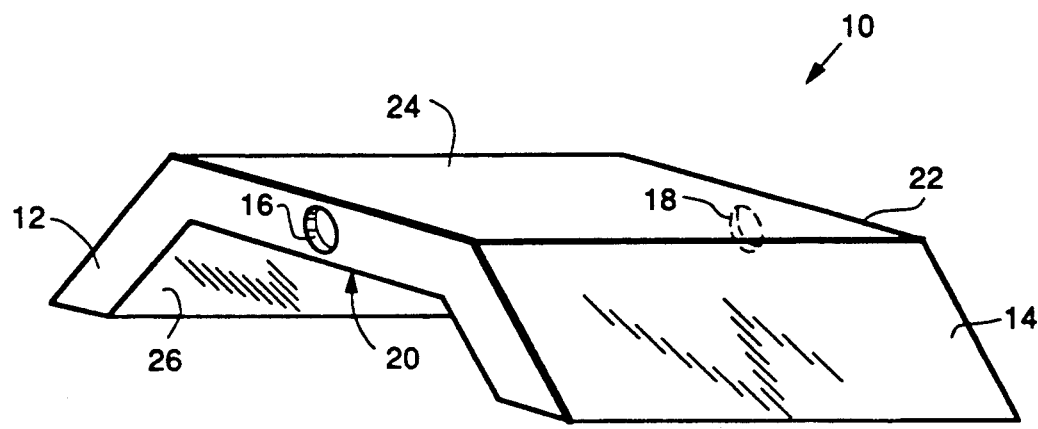
FIG. 1 is an illustrative representation of a rigid fixture used to cast the elastomeric mold of the present invention.

FIG. 1 is an illustrative representation of a rigid fixture 10 used to cast the elastomeric mold of the present invention. The fixture 10 is hollow and includes first and second side members 12 and 14. The side members 12 and 14 are mutually parallel and define first and second fiber apertures 16 and 18. The first and second apertures 16 and 18 are aligned and are located a distance of approximately 1.5 diameters thereof from first and second lower edges 20 and 22 of the first and second side members 12 and 14, respectively. The side members 12 and 14, as well as the top and bottom plates 24 and 26, may be made of Plexiglas or other suitable material. The side members 12 and 14 are joined to the plates 24 and 26 with an adhesive material, such as epoxy, to form an enclosed volume for confining the substance which is cured to form the elastomeric mold of the present invention.

The first step in using the fixture 10 to cast the inventive elastomeric mold involves threading a coated master fiber segment through the apertures 16 and 18. The diameter of the master coated fiber segment is chosen to be equivalent to the desired diameter of the reconstituted buffer coating which will be shaped by the inventive elastomeric mold. For example, if a length of coated optical fiber includes a first segment having an intact buffer coating and a second segment wherein the buffer coating requires repair, the first segment may serve as the master fiber segment used by the fixture 10 to cast the elastomeric mold employed in reconstituting the buffer of the second segment. Next, wax is applied to the surfaces surrounding the first and second apertures 16 and 18 in order to fill any gaps existing between the exterior of the master fiber and the edges of the apertures 16 and 18. The fixture 10 with the master fiber suspended therein is then filled with a transparent silicone material such as Dow Corning Sylgard 184. This transparent material may be dispensed into the fixture 10 through a small hole (not shown) in the top plate 24.

Figure 2:
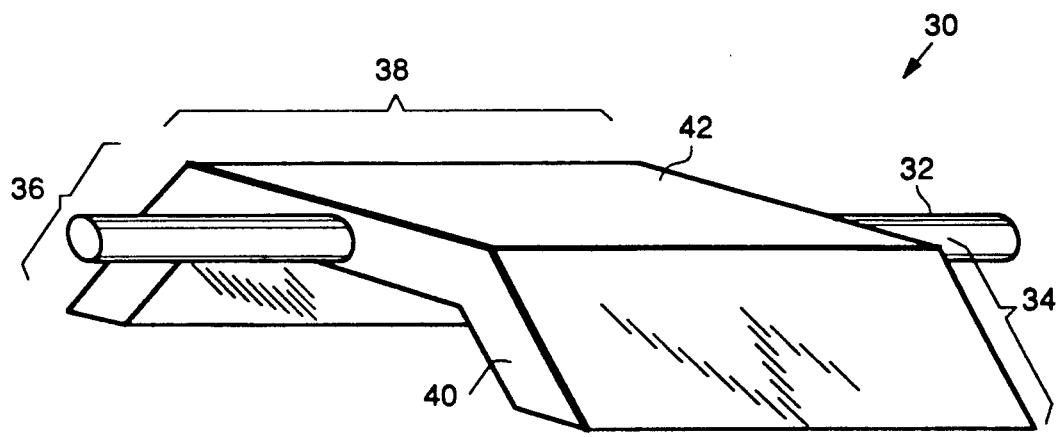
FIG. 2 is a partially transparent side view of the elastomeric mold of the present invention with a master fiber suspended therein.

In order to cure the transparent material disposed therein to an elastomeric state, the fixture 10 may be placed into an environment of 110 degrees Centigrade for approximately 10 minutes. The fixture 10 is then disassembled by fracturing the epoxy bonds between the Plexiglas elements thereof. As shown in the partially transparent side view of FIG. 2, removal of the fixture 10 yields the elastomeric mold 30 of the present invention with a master fiber 32 suspended therein. The mold 30 includes first and second arm members 34 and 36 and a slab member 38. Although the entire elastomeric mold 30 is transparent, in FIG. 2, only a first face 40 thereof is depicted as such in order to enhance the clarity of the representation.

Figure 3:
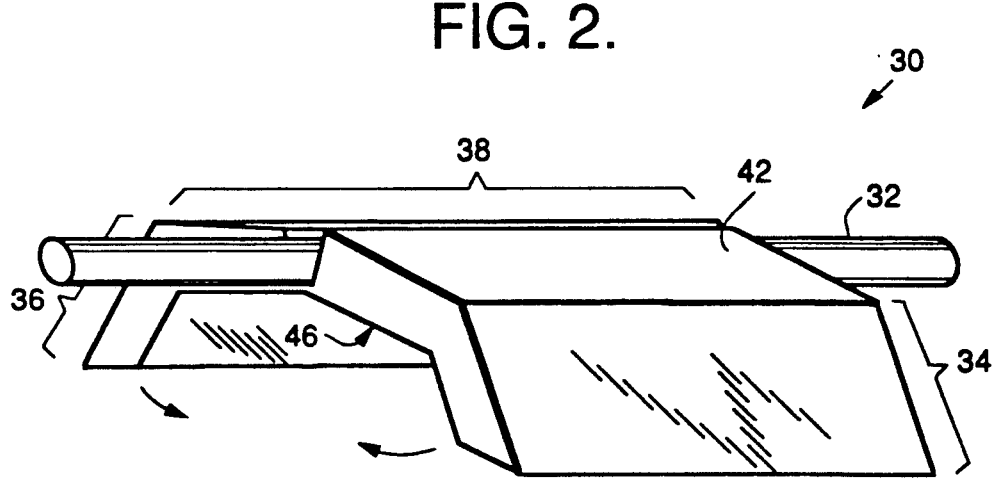
FIG. 3 is a partially transparent side view of the elastomeric mold of the present invention which depicts the slit etched along the length of the master fiber.

Removal of the master fiber 32 from the mold 30 is initiated by slicing a top surface 42 of slab 38 along a longitudinal axis L until the surface of the master fiber is reached. As shown in the partially transparent side view of FIG. 3, the first and second arm members 34 and 36 may be squeezed together while slicing the surface 42 in order to flex the slab 38. Because of the shear forces created within the slab 38 upon squeezing the arm members 34 and 36, the master fiber 32 is preferably embedded within the slab 38 relatively near a lower surface 46 thereof. As mentioned above, this positioning of the master fiber 32 in the present embodiment is effected by locating the first and second apertures 16 and 18 (FIG. 1) near the lower edges 20 and 22 of the first and second side members 12 and 14.

Figure 4:
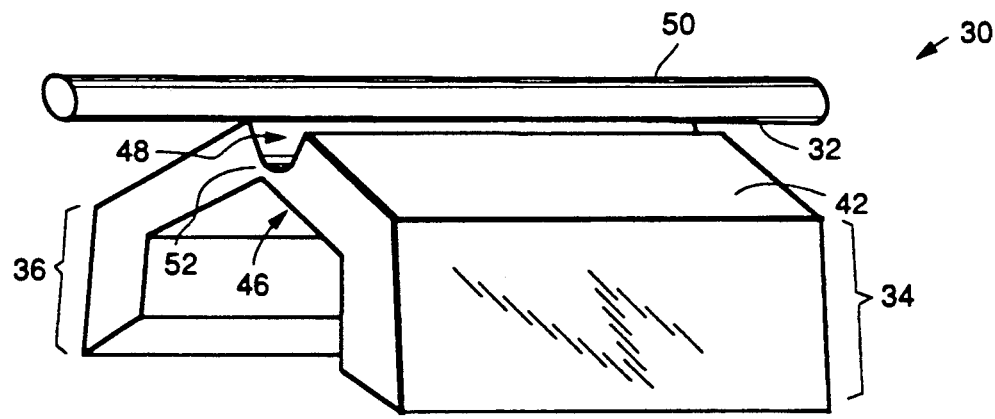
FIG. 4 illustratively represents the mold of the present invention in a fully flexed position with the master fiber removed therefrom.

FIG. 4 shows the mold 30 of the present invention in a fully flexed position with the master fiber 32 removed therefrom. Removal of the fiber 32 creates a channel 48 defined by a channel surface 50. Inspection of FIG. 4 reveals that the region of the slab 38 immediately below the channel 48 serves as an elastomeric hinge 52. That is, by forcing together the first and second arm members 34 and 36 the channel 48 is opened about the elastomeric hinge 52. Similarly, the channel 48 may be closed by forcing the arm members 34 and 36 apart, or by placing the lower surface 46 of the slab 38 on a flat surface (not shown) straddled by the arm members 34 and 36.

Figure 5A:
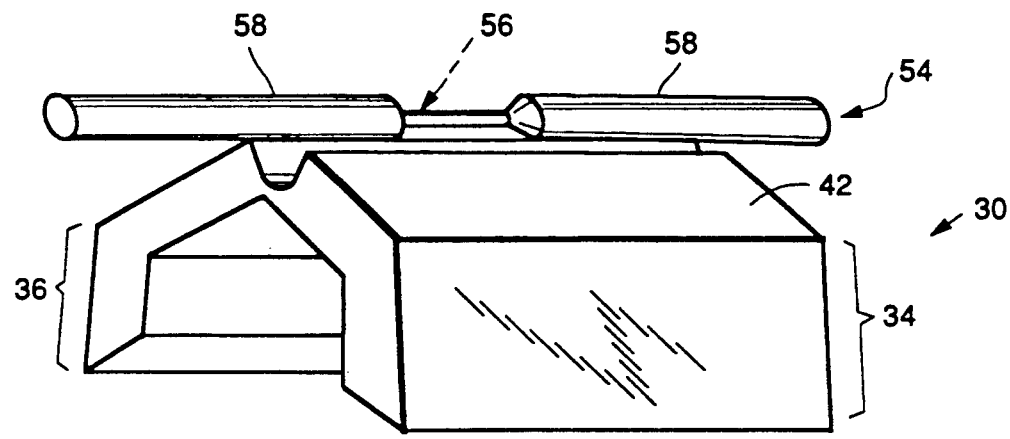
FIGS. 5a, 5b, and 5c illustratively represent the manner in which the elastomeric mold of the present invention may be utilized to reconstitute a portion of the buffer coating of a coated optical fiber.
Figure 5B:
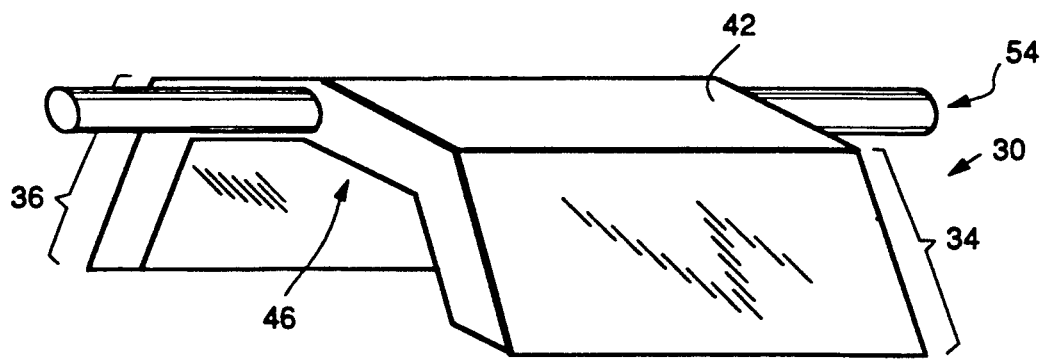
Figure 5C:
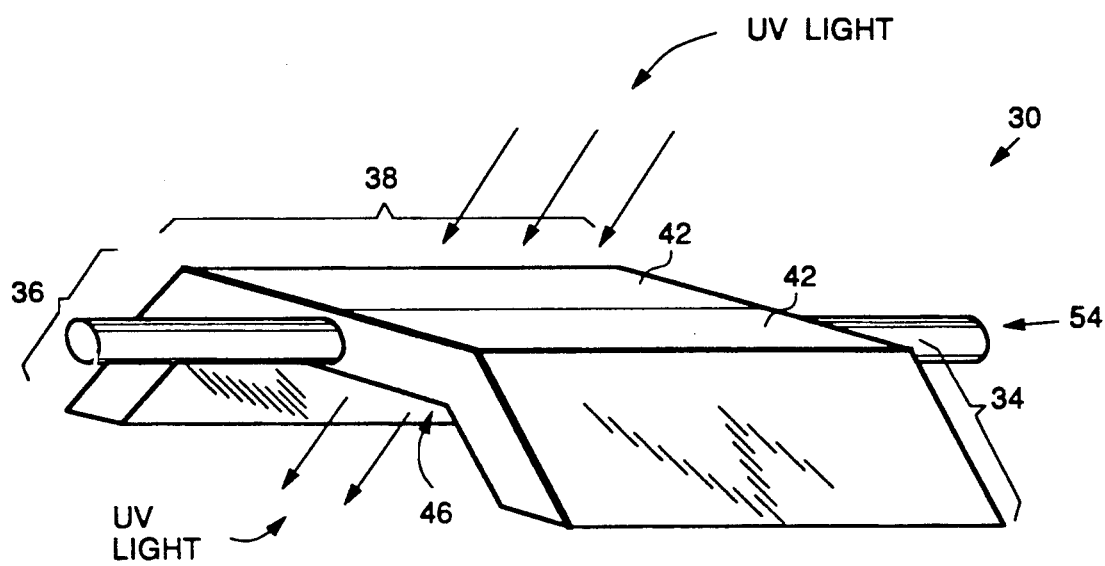

FIGS. 5a, 5b and 5c illustratively represent the manner in which the elastomeric mold 30 of the present invention may be utilized to reconstitute a portion of the buffer coating of a coated optical fiber 54. As shown in FIG. 5a, the fiber 54 includes a segment 56 from which the buffer coating has been removed and is to be reconstituted. As is depicted in FIG. 5b, coating of the segment 56 is commenced by positioning the fiber 54 within the channel 48 and by contemporaneously applying to the segment 56 a coating epoxy (e.g. the Desoto 8 formulation manufactured by W. R. Grace Co., or the Norland 60 or 61 UV optical epoxy). The channel 48 is then closed as described above, thereby encapsulating the fiber 54. As previously noted, the diameter of the master fiber 32 is typically chosen to be identical to that of coated segments 58 of the fiber 54.

The substantially identical dimensions of the closed channel 48 and the coated segments 58 allow the former to precisely envelope the latter and thereby confine the coating epoxy to the space in the channel 48 surrounding the uncoated segment 56. This feature of the present invention constitutes a departure from conventional two-piece buffer molds, wherein the imprecision in the fit between a mold cavity and coated segments of the fiber typically allows migration of the coating epoxy away from the volume of space surrounding the uncoated fiber segment. Within the mold 30, the coating epoxy will generally be limited to migration through the slit in the slab surface 42 in response to capillary forces exerted by the mold 30. Such capillary forces arise as a result of the mold 30 attempting to return to the shape in which it was cast. However, any such migration will be minimal given the narrowness of the slit in the slab 30 when the channel 48 is closed, and thus any accumulation of residual epoxy can be expected to deconstruct upon removal of the fiber 54 from the mold 30 upon opening of the channel 48.

In order to cure the coating epoxy, illumination with ultraviolet (UV) light is typically required. FIG. 5c the mold 30 with the channel 48 in a closed position such that the lower surface 46 of the slab 38 may rest on a planar surface transparent to UV light (e.g. quartz) of a first UV lamp (not shown). Positioning the slab 38 of the mold 30 on such a flat surface is designed to eliminate any mechanical distortion of the elastomeric hinge along the length thereof. The transparent mold 30 may then be illuminated for the requisite time interval, typically less than two minutes, by UV light from the first UV lamp and from a second UV lamp (not shown) positioned above the surface 42 of the slab 38.

Following illumination with UV light, the fiber 54 may be removed from the inventive mold 30. Again, the first and second arm members 34, 36 are squeezed together in order to open the channel 48 along the slit in the surface 42. The fiber is then removed from the opened channel 48. It is noted that, in contrast to conventional buffer coating molds, the texture of the channel 48 renders unnecessary the application of a teflon release agent thereto in order to prevent adhesion of the coating epoxy. This feature of the present invention allows the reconstituted buffer to remain uncontaminated by residual teflon spray.

While the present invention has been described herein with reference to a particular embodiment, it is understood that the invention is not limited thereto. The teachings of this invention may be utilized by one having ordinary skill in the art to make modifications within the scope thereof. For example, the inventive elastomeric mold is not limited to the particular shape described herein. In particular, arm members structured in alternative configurations may be suitable for flexing an elastomeric slab member to open a channel therein. Indeed, in a simplified embodiment of the present invention arm members distinct from the elastomeric slab itself may be omitted altogether—with opening of the channel being accomplished by directly flexing the slab.

Moreover, the inventive elastomeric mold is not limited to the particular elastomeric material described herein. For example, those skilled in the art may be aware of other substances exhibiting the requisite flexibility and lack of adhesion to coating epoxy.

Accordingly,

What is claimed is:

1. An elastomeric mold for shaping a buffer coating applied to an optical fiber, comprising:
   an elastomeric slab having a first major surface and a first end and a second and;
   a channel defining a passageway through the slab and extending from proximate said first end to proximate said second end for substantially confining said buffer coating;
   a slit in said first major surface extending from said major surface to said channel; and
   arm means coupled to said slab for flexing said slab to open said channel along said slit.

2. The elastomeric mold of claim 1 wherein said channel is cylindrical and is included in a volume of said slab within approximately two diameters of said channel from said first major surface.

3. An elastomeric mold for shaping a buffer coating applied to an optical fiber, comprising:
   an elastomeric slab for substantially confining said buffer coating within a channel, said channel being defined by an inner surface having a first cross-section and a longitudinal axis and
   arm means for flexing said elastomeric slab to open said channel along said longitudinal axis.

4. The elastomeric mold of claim 3 wherein said elastomeric slab has a first substantially planar surface.

5. The elastomeric mold of claim 4 wherein said first planar surface is substantially parallel to said longitudinal axis.

6. The elastomeric mold of claim 5 wherein said channel is cylindrical and is included in a volume of said slab within approximately two diameters of said channel from said first surface.

7. The elastomeric mold of claim 5 wherein said elastomeric slab has second and third surfaces which intersect said longitudinal axis, said second and third surfaces defining first and second apertures of said channel.

* * * * *